United States Patent [19]
Hiyama et al.

[11] Patent Number: 5,943,108
[45] Date of Patent: Aug. 24, 1999

[54] MATRIX TYPE LIQUID CRYSTAL DISPLAY WITH SUBSTRATE HAVING BLUE FILTER FOR MASKING AT LEAST 75% OF TOTAL PLANAR AREA OF AUXILIARY ELECTRODES

[75] Inventors: Hiroki Hiyama, Atsugi; Masaaki Suzuki, Yokohama; Noriyuki Nakai, Ayase, all of Japan

[73] Assignee: Canon Kabushiki Kaisha, Tokyo, Japan

[21] Appl. No.: 08/893,625

[22] Filed: Jul. 11, 1997

[30] Foreign Application Priority Data

Jul. 12, 1996 [JP] Japan ................................. 8-203107

[51] Int. Cl.$^6$ ........................ G02F 1/1335; G02F 1/1333
[52] U.S. Cl. ............................ 349/106; 349/108; 349/110
[58] Field of Search .................................... 349/106, 110, 349/108

[56] References Cited

U.S. PATENT DOCUMENTS

| | | | |
|---|---|---|---|
| 3,812,394 | 5/1974 | Kaplan | 313/92 |
| 4,662,721 | 5/1987 | Harada et al. | 350/339 |
| 4,810,060 | 3/1989 | Ukai | 349/106 |
| 5,185,059 | 2/1993 | Nishida et al. | 156/659.1 |
| 5,278,683 | 1/1994 | Nishida et al. | 359/66 |
| 5,285,300 | 2/1994 | Suzuki et al. | 359/54 |
| 5,406,398 | 4/1995 | Suzuki et al. | 359/80 |
| 5,493,429 | 2/1996 | Kanemoto et al. | 349/106 |
| 5,528,398 | 6/1996 | Suzuki et al. | 359/68 |
| 5,580,436 | 12/1996 | Suginoya et al. | 349/106 |
| 5,587,818 | 12/1996 | Lee | 349/106 |
| 5,610,740 | 3/1997 | Kamamori et al. | 349/110 |
| 5,623,353 | 4/1997 | Kanemoto et al. | 349/106 |
| 5,729,313 | 3/1998 | Mitsui | 349/106 |
| 5,734,456 | 3/1998 | Takao et al. | 349/106 |
| 5,777,707 | 7/1998 | Masaki et al. | 349/110 |

*Primary Examiner*—William L. Sikes
*Assistant Examiner*—Tarifur R. Chowdhury
*Attorney, Agent, or Firm*—Fitzpatrick, Cella, Harper & Scinto

[57] ABSTRACT

A matrix-type liquid crystal display device is constituted by a pair of substrates and a liquid crystal disposed between the substrates. At least one of the substrates including one on a viewer side includes a transparent substrate having thereon transparent electrodes, auxiliary electrodes of a metal electrically connected with the transparent electrodes respectively associated therewith and a blue filter disposed closer to the viewer side so as to mask at least 75% of a total planar area of the auxiliary electrodes as viewed from the viewer side. As a result, the reflected light lowering the recognizability of a display on the liquid crystal device can be decreased without incurring a substantial increase in production cost.

7 Claims, 3 Drawing Sheets

MATRIX TYPE LIQUID CRYSTAL DISPLAY WITH SUBSTRATE HAVING BLUE FILTER FOR MASKING AT LEAST 75% OF TOTAL PLANAR AREA OF AUXILIARY ELECTRODES

FIELD OF THE INVENTION AND RELATED ART

The present invention relates to a liquid crystal display device.

FIG. 3 is a schematic sectional view of a conventional color liquid crystal display device. As shown in FIG. 3, in the color liquid crystal display device, a liquid crystal 3 is hermetically disposed between a scanning line-side transparent substrate 1 and a data line-side transparent substrate 2. The inner side of the scanning line-side transparent substrate 1 is provided with a color filter pattern 4 including a blue filter 4a and red or green filters 4b, an optional flattening layer (not shown) disposed thereon, and transparent electrodes 5. On the transparent electrodes 5, auxiliary electrodes 6 of a metal are disposed, e.g., for adjusting a resistance in a manner so as to define display bits (light-transmissive portions or pixels). Further, over the transparent electrodes 5 (or 5a) and the auxiliary electrodes 6 (or 6a) on each substrate 7 (or 2), an alignment control film (not shown) for controlling the alignment state of the liquid crystal 3 is disposed as desired.

On the data line-side transparent substrate 2, transparent electrodes 5a and auxiliary electrodes 6a are disposed in this order. On the other side of the data line-side transparent substrates 2, a backlight 7 is disposed, and light from the backlight 7 is transmitted through the respective display bits to be colored in respective colors corresponding to the respective color filters thereat and transmitted through an outer viewing face 9 to reach a viewer 8.

In addition to the light from the backlight 7 transmitted through the display bits, the viewer 8 receives reflected light formed by reflection of light from the viewer side such as external light inclusive of illumination light incident to the color liquid crystal display device and returned to the viewer side. The reflected light obstructs the recognition of a displayed picture so that it is necessary to lower the entire reflectivity of the color liquid crystal display device. For example, among the structural members constituting the color liquid crystal display device shown in FIG. 3, the auxiliary electrodes 6 and 6a composed of a metal exhibit an especially large reflectivity and accordingly the reflectivity of the auxiliary electrodes, particularly auxiliary electrodes 6 on the viewer side substrate 1, should be lowered. This may be accomplished by using narrower auxiliary electrodes but this results in an increased electrode resistance and an increased liability of electrode breakage, thus providing a certain limit.

SUMMARY OF THE INVENTION

In view of the above-mentioned problems, an object of the present invention is to provide a liquid crystal display device with a reduced reflected light and an improved recognizability without changing the disposition of the auxiliary electrodes or incurring an increase in production cost thereof.

According to the present invention, there is provided a matrix-type liquid crystal display device, comprising a pair of substrates and a liquid crystal disposed between the substrates, wherein at least one of the substrates including one on a viewer side comprises a transparent substrate having thereon transparent electrodes, auxiliary electrodes of a metal electrically connected with the transparent electrodes respectively associated therewith and a blue filter disposed closer to the viewer side so as to mask at least 75% of a total planar area of the auxiliary electrodes as viewed from the viewer side.

The present invention may preferably be embodied as a color liquid crystal display device including at least three colors of R (red), G (green) and B (blue) filters each divided into a plurality of filter segments each corresponding to a display bit allowing light transmission for display, and the blue segments are extended from the display bits to form a masking region for masking a large planar areal proportion of the auxiliary electrodes as viewed from the viewer side, thereby lowering the reflectivity of the color liquid crystal display device to result in reduced reflected light.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The present invention provides a matrix-type liquid crystal display device wherein the auxiliary electrodes are masked by a blue color filter having a lower transmittance compared with color filters of other primary colors disposed on a transparent substrate on a viewer side so as to mask at least 75% of a total planar area of the auxiliary electrodes as viewed from the viewer side, thereby lowering the reflectivity of the liquid crystal display device and reducing reflected light therefrom.

According to a preferred embodiment of the present invention, there is provided a matrix-type color liquid crystal display device comprising a pair of transparent substrates and a liquid crystal sandwiched between the transparent electrodes, wherein at least one transparent substrate has thereon auxiliary electrodes of a metal and a blue filter disposed closer to the viewer side so as to preferentially mask the auxiliary electrodes as viewed from the viewer side.

A preferred embodiment of the present invention will be described based on the drawings.

Figure 1:
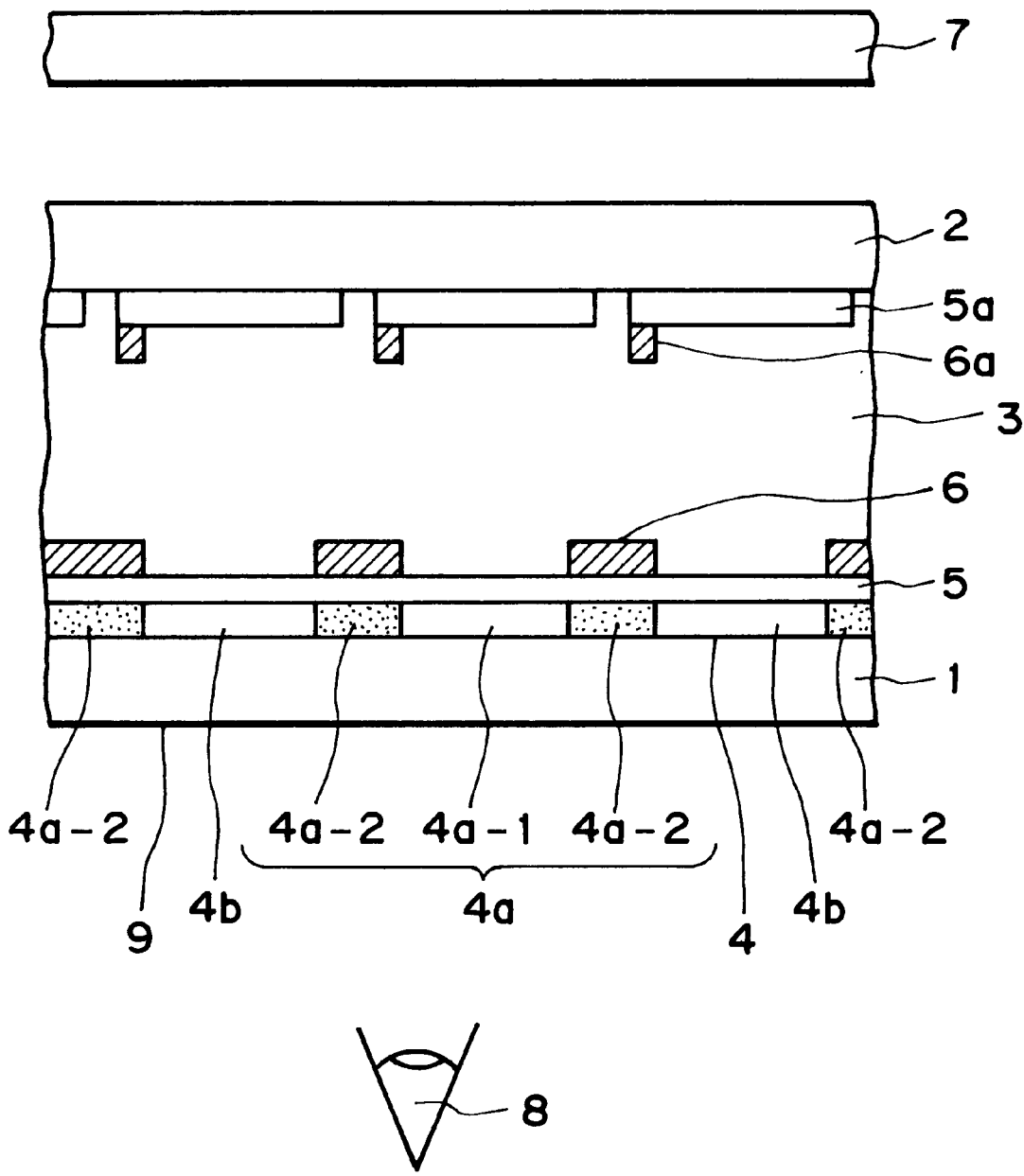
FIG. 1 is a sectional view of a color liquid crystal display device according to an embodiment of the invention.

FIG. 1 is a sectional view of a color liquid crystal display device having three color filters of R, G and B as an embodiment of the liquid crystal display device according to the present invention showing a section passing through a blue display bit. Referring to FIG. 1, the color liquid crystal display device includes a scanning line-side transparent substrate 1, a data line-side transparent substrate 2, and a liquid crystal 3 hermetically disposed between the transparent substrates 2 and 3. On the inner side of the scanning line-side transparent substrate 1, there is formed a color filter pattern 4 including a blue filter divided into a plurality of blue filter segments 4a and red or green filters each divided into a plurality of red or green filter segments 4b. The color filter pattern 4 may optionally be coated with a flattening layer (not shown) and is further provided thereon with transparent electrodes 5 and auxiliary electrodes 6 disposed electrically connected with the transparent electrodes 5 so as to adjust the resistance of the resultant laminate electrodes. The auxiliary electrodes 6 are disposed to also define color display bits (color dots or pixels) corresponding to color filter segments 4a, 4b and 4c, i.e., at parts not covered by the auxiliary electrodes 6. No particular metal masking layer is formed between the respective color filter segments 4a.

On the data line-side transparent substrate 2 disposed opposite the scanning line-side transparent substrate 1, there are sequentially formed transparent electrodes 5a and auxiliary electrodes 6a so that they intersect the transparent electrodes 5 on the scanning line-side transparent substrate 1 at nearly right angles to form an electrode matrix. The transparent electrodes and auxiliary electrodes on the respective substrates 1 and 2 may be further coated with an alignment film (not shown) for controlling the alignment state of the liquid crystal 3.

In the above-mentioned structure, the spacing between the color dots is masked by the auxiliary electrodes 6 and 6a, preferably mostly by the auxiliary electrodes 6 formed on the substrate 1. Further, among the color filter segments constituting the color filter pattern 4, each blue filter segment 4a comprises a portion 4a-1 forming a display bit (color dot) and masking portions 4a-2 disposed corresponding to and so as to mask at least the auxiliary electrodes 6 on the same substrate and further the auxiliary electrodes 6a as viewed from a viewer-side surface 9. The blue filter (segments) 4a is disposed to mask at least 75%, preferably 80–100%, of the total planar area of the auxiliary electrodes 6 and 6a as viewed from the viewer 8 side (while extruding the portion of the auxiliary electrodes 6a masked by the auxiliary electrode 6). It is preferred that the blue filter 4a is disposed to mask 100% of the planar area of the auxiliary electrodes 6 disposed on the viewer-side substrate 1 of which the reflectivity exerts a particularly adverse effect.

On the outside (the opposite side from the viewer 8) of the data line-side transparent substrate 2, a backlight 7 is disposed, and light from the backlight 7 is converted into respective colors of display light when passing through the color filter 4 at respective display bits, to pass the viewing surface 9 on the outer side of the scanning line-side transparent substrate 1 and reach the viewer 8.

In this instance, according to the present invention, among the color filters formed on the viewer-side transparent substrate, a blue filter showing the lowest transmittance at an identical thickness is disposed in a pattern suitable for masking the auxiliary electrodes, whereby the reflectivity of the color liquid crystal display device on the viewer side is lowered to decrease reflected light therefrom.

The color liquid crystal display device structure described above can be applied to various modes of liquid crystal devices inclusive of TN-mode, STN-mode and a mode using a chiral smectic liquid crystal (e.g., a ferroelectric liquid crystal).

Hereinbelow, the present invention will be described based on specific examples.

EXAMPLE 1

A color liquid crystal display device having a structure as described with reference to FIG. 1 was prepared.

First of all, a 1 mm-thick transparent glass substrate was provided with a ca. 1 $\mu$m-thick color filter pattern 4 as shown in FIG. 1 by repetition of a sequence of spinner coating, pattern exposure and development for each of colored photosensitive resins containing a pigment dispersed therein ("PA-102R", "PA-102G" and "PA-102B", respectively available from Ube Kosan K.K.) in a pattern designed so that the blue filter segments were larger in size than the red and green filter segments and extended up to a position below auxiliary electrodes 6 to be formed thereabove. Then, the color filter pattern 4 was coated with a ca. 2 $\mu$m-thick flattening layer of an organosilane resin ("PSB-K31", available from Toray K.K.), on which ca. 700 Å-thick and 90 $\mu$m-wide stripe-shaped transparent electrodes 5 of ITO were formed in alignment with the color filter pattern 4. Further, totally ca. 1800 Å-thick molybdenum alloy/aluminum two-layered auxiliary electrodes 6 (each in a form of roughly a ladder having a step portion width of 20 $\mu$m and a side portion width of 10 $\mu$m on both sides, were formed on the transparent electrodes 5 and at positions covered by the blue color filter 4a as shown in FIG. 1 so as to define color dots of red, green and blue (each in an aperture size of 70 $\mu$m×80 $\mu$m) corresponding to the respective color filter segments. As a result, ca. 34% the planar area of the substrate 6 on the viewer side was covered by the auxiliary electrodes 6. The transparent electrodes 5 and auxiliary electrodes 6 were further coated with a 200 Å-thick alignment film of polyimide ("LQ-180", available from Hitachi Kasei K.K.), followed by rubbing.

On the other hand, another transparent glass substrate similar to the above was provided with transparent electrodes 5a and auxiliary electrodes 6a (each in a form of roughly a comb having a teeth portion with of 20 $\mu$m and a spin portion width of 5 $\mu$m so as to increase the total planar area masking percentage of 9%) in a similar manner as above but without steps for providing the color filter pattern 4. Further, an alignment film of polyimide was formed thereon and rubbed.

The thus-treated two substrates were disposed opposite to and superposed with each other with a spacing of ca. 1 $\mu$m therebetween so that their stripe-shaped transparent electrodes intersected each other to form an electrode matrix and their rubbing directions extent in generally identical directions but crossed each other at an angle of 8 deg., thereby forming a blank cell. The blank cell was then filled with a mixture liquid crystal having a refractive index anisotropy $\Delta n = 0.19$ ($n_e = 1.619$, $n_0 = 1.051$) and also the following phase transition series:

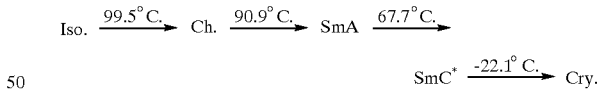

As a result, a color liquid crystal display device having a sectional structure as shown in FIG. 1 was provided, wherein the blue filter 4a was disposed to mask 75% of the total planar area of the auxiliary electrodes 6 and 6a on the two substrates 1 and 2 as viewed from the viewer side, by masking ca. 95% of the auxiliary electrodes 6 on the substrate 1.

The liquid crystal display device was disposed so that the color filter-side substrate faced a viewer, and a backlight device 7 was disposed behind the opposite substrate, to complete a color liquid crystal display device.

EXAMPLE 2

A color liquid crystal display device having a sectional structure as shown in FIG. 4 was prepared in a similar manner as in Example 1 except that the blue filter 4a was formed in a pattern just covering blue display dots and not extended to mask the auxiliary electrodes 6.

The above-prepared two color liquid crystal display devices (panels) were subjected to a reflectance measurement test in the following manner.

A measurement point was set on a display surface of a test panel, and a light source was placed at a position forming a light incident angle of 10 deg. with respect to and at a distance of 50 cm from the measurement point. Further, a luminance meter ("BM-7", available from Topcon K.K.) was placed at a position forming a reflection angle of 10 deg. with respect to and at a distance of 50 cm from the measurement point to measure a reflection luminance at the panel surface. On the other hand, in the optical system, the test panel was removed and the luminance meter was shifted to a position opposite to and at a linear distance of 100 cm from the same light source to measure a light source luminance. From the thus-measured two luminance values, the surface reflectance of the test panel was determined by the following formula:

Reflectance (%) = [Reflection luminance/light source luminance] × 100

The above measurement was performed at light source sizes in terms of viewing angles of 1 deg., 5 deg. and 10 deg. as measured at the position of 50 cm from the measurement point on the display surface. The light source per se was a ball-shaped white fluorescent lamp having a uniform luminance of ca. 11,000 cd/cm, and the light source size was varied by placing three sizes of apertures just behind the light source and in front of the test panel. Further, the measurement angle at the luminance meter for the luminance measurement object was set to 0.2 deg. for 1 deg. and 5 deg., and 2 deg. for 10 deg., respectively, of the viewing angle sizes of the light source.

Figure 2:
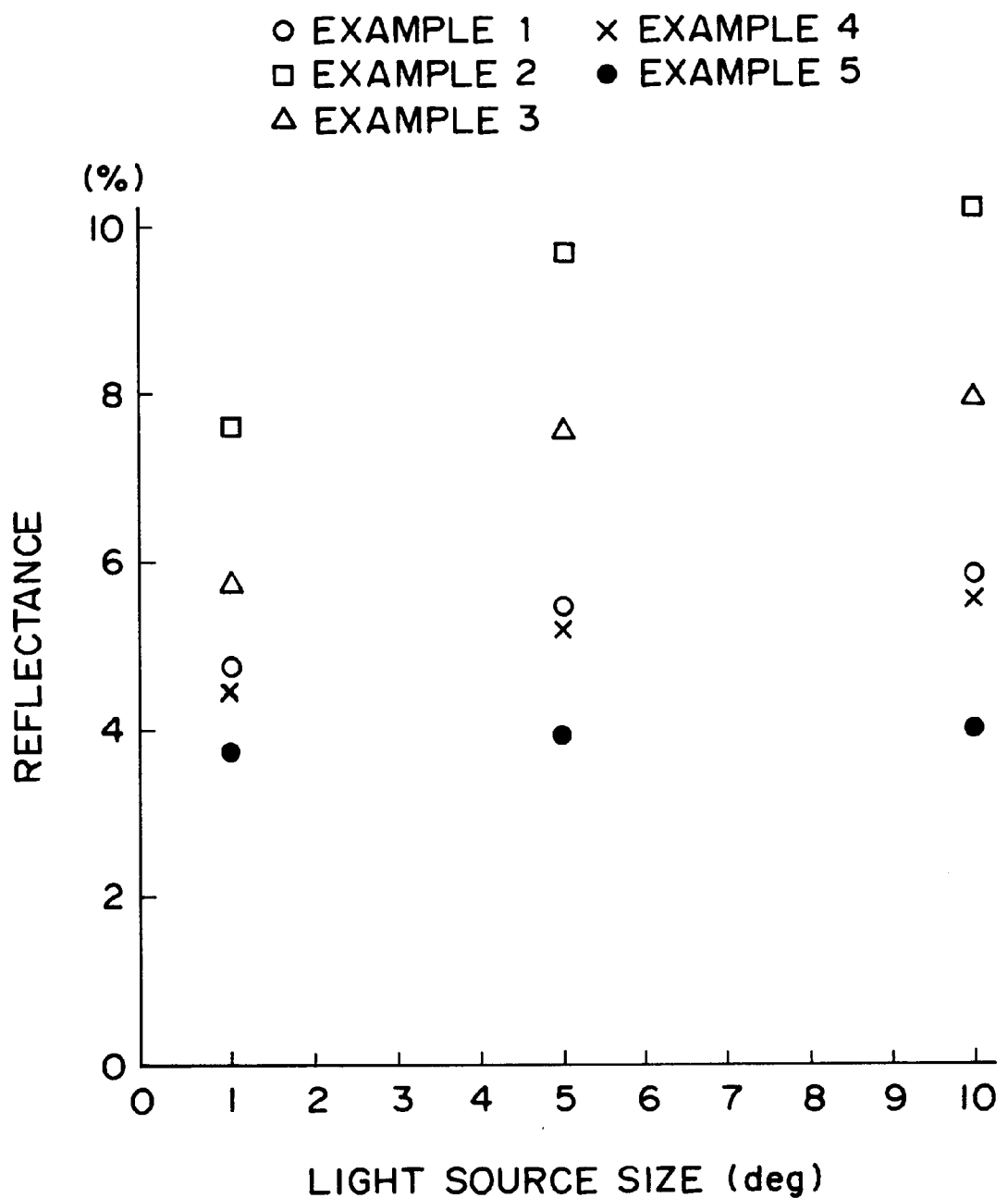
FIG. 2 is a graph showing reflectances of devices according to Examples 1–5 (having different auxiliary electrodes washing rates) depending on the sizes of light sources.
Figure 3:
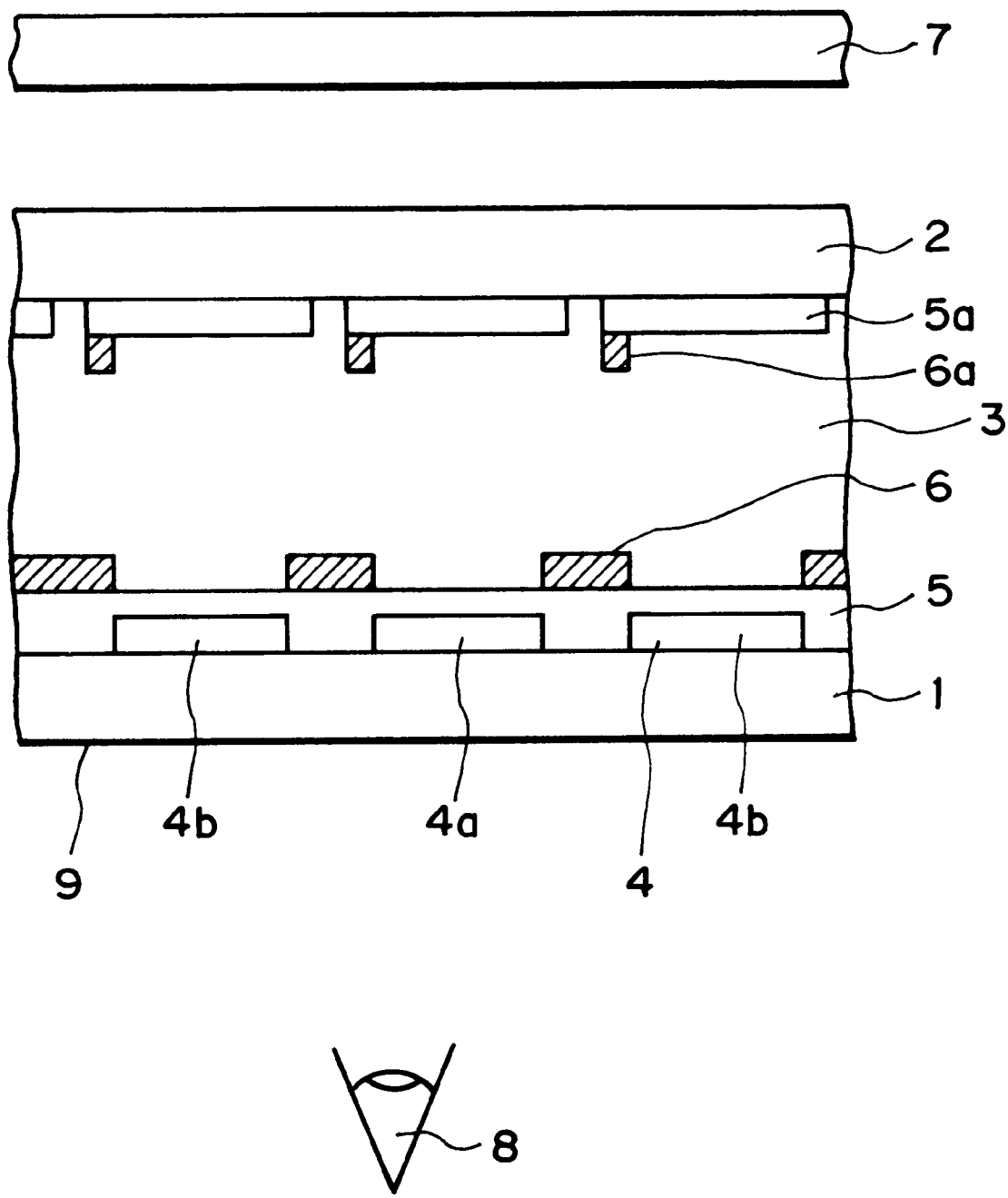
FIG. 3 is a sectional view of a color liquid crystal display device of a conventional liquid crystal display device.

As a result, the devices of Examples 1 and 2 provided the reflectances indicated by plots of o and □, respectively, as shown in FIG. 2. As is understood from FIG. 2, the device of Example 1 provided reflectances below 6% regardless of the light source sizes, which reflectances were 2–4% lower than those given by the device of Example 2, thus exhibiting a reflectivity lowering effect attained by masking of the auxiliary electrodes with the flue filter.

EXAMPLES 3–5

Three color liquid crystal display devices were prepared in similar manners as in Example 1 except that the electrode arrangement on both substrates and the blue filter disposition were determined so that the blue filter masked 50% (Example 3, by masking ca. 63% of the auxiliary electrodes 6 on the viewer side substrate 1), 80% (Example 4, by fully masking the auxiliary electrodes 6 on the viewer side substrate 1) and 100% (Example 5, by fully masking the auxiliary electrodes 6 and 6a on both substrates), respectively, of the total planar area of the auxiliary electrodes on both substrates as viewed from the viewer side. As a result of reflectance measurement in the same manner as described with reference to Examples 1 and 2, the devices of Examples 3–5 showed reflectances depending on light source sizes as indicated by plots of ∆(Example 3), x (Example 4) and ● (Example 5), respectively, also shown in FIG. 2. As shown in FIG. 2, the device of Example 5 exhibited reflectances 1–1.5% lower than those of the device of Example 1. Further, FIG. 2 shows that a higher masking percentage of the auxiliary electrodes by the blue filter provided a color liquid crystal display device showing a lower reflectance, and particularly masking percentages of 75% or higher provided reflectance below 6% regardless of light source sizes to provide a display surface showing less glittering appearance.

As described above, according to the present invention, the reflectivity of a liquid crystal display device can be effectively lowered by masking the auxiliary electrodes with a blue filter to reduce the quantity of reflected light lowering the recognizability of a display on the display device. In case where the present invention is applied to a color liquid crystal display device, the blue filter for masking the auxiliary electrodes can be formed simultaneously in the step of forming a blue filter providing blue color display bits (or pixels), so that no increase in production step is incurred thereby. As the need for narrowing the auxiliary electrode width is decreased, the problems accompanying the narrowing, such as an increased electrical resistance and a breakage, leading to a lower production yield, can be alleviated. Accordingly, a color liquid crystal display device having an excellent recognizability due to decreased reflection light, can be produced without causing an increase in production cost.

What is claimed is:

1. A matrix-type liquid crystal display device, comprising a pair of substrates and a liquid crystal disposed between the substrates, wherein at least one of the substrates including one on a viewer side comprises a transparent substrate having thereon transparent electrodes, auxiliary electrodes of a metal electrically connected with the transparent electrodes respectively associated therewith and a blue filter disposed closer to the viewer side so as to mask at least 75% of a total planar area of the auxiliary electrodes as viewed from the viewer side.

2. A liquid crystal display device according to claim 1, wherein said one substrate on the viewer side has thereon a red filter and a green filter in addition to the blue filter, the red, green and blue filters being respectively divided into filter segments each corresponding to a display bit allowing light transmission, and the blue filter segments being extended from the associated display bits to mask the auxiliary electrodes.

3. A liquid crystal display device according to claim 1, wherein said blue filter is disposed so as to mask at least 80% of the total planar area as viewed from the viewer side.

4. A liquid crystal display device according to claim 1, wherein the auxiliary electrodes disposed on the substrate on which the blue filter is disposed is masked by the blue filter with respect to the entire planar area thereof as viewed from the viewer side.

5. A liquid crystal display device according to claim 1, wherein the substrate on which the blue filter is disposed is provided with scanning electrodes, and the other substrate is provided with data electrodes, so as to effect a matrix drive of the liquid crystal in mutual association of the scanning and data electrodes.

6. A liquid crystal display device according to claim 1, wherein the pair of substrates each comprises a transparent substrate.

7. A liquid crystal display device according to claim 1, wherein the liquid crystal is a chiral smectic liquid crystal.

* * * * *